(12) United States Patent
Hayakawa et al.

(10) Patent No.: US 7,749,584 B2
(45) Date of Patent: Jul. 6, 2010

(54) HEAT-SHRINKABLE POLYESTER FILMS

(75) Inventors: Satoshi Hayakawa, Inuyama (JP); Norimi Tabota, Inuyama (JP); Yoshinori Takegawa, Ohtsu (JP); Katsuya Ito, Ohtsu (JP); Shigeru Komeda, Osaka (JP); Katsuhiko Nose, Osaka (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 1212 days.

(21) Appl. No.: 10/482,870

(22) PCT Filed: Jul. 10, 2002

(86) PCT No.: PCT/JP02/06987

§ 371 (c)(1),
(2), (4) Date: May 10, 2004

(87) PCT Pub. No.: WO03/006229

PCT Pub. Date: Jan. 23, 2003

(65) Prior Publication Data

US 2004/0180229 A1  Sep. 16, 2004

(30) Foreign Application Priority Data

Jul. 11, 2001 (JP) .............................. 2001-210693

(51) Int. Cl.
*B29C 55/00* (2006.01)
*B65B 53/02* (2006.01)
*C08G 63/02* (2006.01)
*C08G 63/12* (2006.01)
*C08G 63/16* (2006.01)

(52) U.S. Cl. ...................... 428/34.9; 428/35.1; 428/480
(58) Field of Classification Search ........................ None
See application file for complete search history.

(56) References Cited

U.S. PATENT DOCUMENTS

| | | | |
|---|---|---|---|
| 5,824,398 A | 10/1998 | Shih | |
| 6,447,925 B1 * | 9/2002 | Tabota et al. ................. | 428/480 |
| 6,765,070 B2 * | 7/2004 | Tamura et al. ............... | 525/444 |
| 6,939,616 B2 * | 9/2005 | Hayakawa et al. .......... | 428/480 |
| 6,958,178 B2 * | 10/2005 | Hayakawa et al. .......... | 428/34.9 |
| 7,001,651 B2 * | 2/2006 | Hayakawa et al. .......... | 428/34.9 |
| 7,344,765 B2 * | 3/2008 | Hayakawa et al. .......... | 428/34.9 |

FOREIGN PATENT DOCUMENTS

| | | |
|---|---|---|
| EP | 210646 A1 | 2/1987 |
| EP | 0 386 450 A | 9/1990 |
| EP | 0 854 175 A | 7/1998 |
| JP | 5742726 A | 3/1982 |
| JP | 59-053530 | 3/1984 |
| JP | 59-064628 | 4/1984 |
| JP | 61-241352 | 10/1986 |
| JP | 62-091555 | 4/1987 |
| JP | 62-095341 | 5/1987 |
| JP | 63-027235 | 2/1988 |
| JP | 63139725 A | 6/1988 |
| JP | 63152639 A | 6/1988 |
| JP | 64-004326 | 1/1989 |
| JP | 4117432 A | 4/1992 |
| JP | 5169536 A | 7/1993 |
| JP | 5245930 A | 9/1993 |
| JP | 5318587 A | 12/1993 |
| JP | 631806 A | 2/1994 |
| JP | 06-339991 | 12/1994 |
| JP | 71583 A | 1/1995 |
| JP | 753737 A | 2/1995 |
| JP | 753756 A | 2/1995 |
| JP | 7032478 A | 2/1995 |
| JP | 7138388 A | 5/1995 |
| JP | 7205283 A | 8/1995 |
| JP | 7205284 A | 8/1995 |
| JP | 825477 A | 1/1996 |
| JP | 827260 A | 1/1996 |
| JP | 827261 A | 1/1996 |
| JP | 827285 A | 1/1996 |
| JP | 834841 A | 2/1996 |
| JP | 8192464 A | 7/1996 |
| JP | 09-272150 | 10/1997 |
| JP | 1067923 A | 3/1998 |
| JP | 11-071473 | 3/1999 |
| JP | 11124448 A | 5/1999 |
| JP | 2001181416 A | 7/2001 |
| JP | 200220470 A | 1/2002 |
| JP | 200220471 A | 1/2002 |
| JP | 200208618 A | 3/2002 |
| JP | 200280618 A | 3/2002 |
| JP | 200288172 A | 3/2002 |
| JP | 2003145619 A | 5/2003 |
| WO | 9505278 A | 2/1995 |
| WO | 9514734 A | 6/1995 |
| WO | 9749757 A | 12/1997 |

OTHER PUBLICATIONS

International Search Report No. PCTJP0206987, Oct. 22, 2002.
Notice of Reasons for Rejection dated Aug. 3, 2004, Japanese Patent Application No. 2000-210693 filed Jul. 27, 2004 (with English translation).

* cited by examiner

*Primary Examiner*—Edmund H. Lee
(74) *Attorney, Agent, or Firm*—Kenyon & Kenyon LLP

(57) ABSTRACT

In heat-shrinkable polyester films, the content of 1,4-cyclohexane dimethanol is 10 to 50% by mole based on the polyhydric alcohol component and that the heat shrinkage factors of a 10 cm square sample of the films in (A) hot water of 75° C., (B) hot water of 85° C., and (C) hot water of 95° C. are 30 to 40%, 50 to 60%, and 65 to 77%, respectively. The films can be produced by drawing under specified conditions.

7 Claims, No Drawings

HEAT-SHRINKABLE POLYESTER FILMS

TECHNICAL FIELD

The present invention relates to heat-shrinkable polyester films, and a process for production thereof and more particularly to heat-shrinkable polyester films suitable for production of labels, and a process for production thereof.

BACKGROUND ART

Heat-shrinkable plastic films are widely used for production of heat-shrinkable packages, heat-shrinkable labels, and the like by utilizing the heat-shrinking property thereof. Among such films, drawn films such as polyvinyl chloride film, polystyrene film, and polyester film are used for production of labels, cap seals, or refuse (garbage) packages in various kinds of containers such as polyethylene terephthalate (PET) containers, polyethylene containers, and glass containers.

However, polyvinyl chloride films have low heat resistance, and likely to emit hydrogen chloride gas at the time of incineration, thereby emitting dioxin. Further, in use of heat-shrinkable vinyl chloride resinous film as shrinkable labels on PET containers or the like, the labels and the containers are required to be separated from each other in recycling of the containers.

Polystyrene films are preferable in the aspect of good finishing appearance after shrinkage. However, since they have low resistance to a solvent, it is required to use an ink having a special composition in printing. Further, polystyrene resin is required to be incinerated at a high temperature, and a large amount of black smoke and nasty odor are likely to be generated at the time of incineration.

There is a great expectation for polyester films free of such problems as substitute shrinkable labels for polyvinyl chloride films and polystyrene films. As consumption of PET containers is increased, there is a tendency that consumption of polyester films is increased.

Despite of the above merits, there is a demand for further improvement in the conventional heat-shrinkable polyester films in the aspect of shrinking property. Particularly, characters, patterns, images or the like (hereinafter, simply called as "printed design") that have been printed on films before shrinkage are likely to be distorted at the time of attaching the films to containers such as PET bottles, polyethylene bottles, and glass bottles by heat shrinkage owing to generation of shrinkage shading, or crinkling. Accordingly, there is a demand from users of reducing such distortion.

Compared with heat-shrinkable polystyrene films, polyester films have poor shrinkage at a low temperature. In view of this, it is required to shrink polyester films at a high temperature to obtain a required shrinkage, which may likely to cause deformation of bottle bodies and whitening of bottles.

In attaching heat-shrinkable films to containers by beat shrinkage, the films are shaped into various shapes such as labels and bags after carrying out a printing step, if necessary. After placing the label-like films or the bag-like films onto the containers, the films are tightly attached to the containers by heat shrinkage while conveying the containers with the films on a belt conveyor or the like through a shrinking tunnel (steam tunnel) wherein heated steam is blown in for heat shrinkage or a shrinking tunnel (hot-air tunnel) wherein hot air is blown in for heat shrinkage.

A steam tunnel provides higher heat transfer efficiency than a hot-air tunnel and makes it possible to perform more uniform heat shrinkage. Compared with a hot-air tunnel, a steam tunnel provides superior finishing appearance after heat shrinkage. However, compared with polyvinyl chloride films and polystyrene films, the conventional heat-shrinkable polyester films are poor in shrink finishing appearance after being conveyed through the steam tunnel.

Further, in use of a hot-air tunnel in which temperature spots are likely to appear during heat shrinkage, whitening, shrinkage shading, crinkling, distortion or a like drawback is likely to appear on the conventional polyester films. Particularly, whitening causes a serious deterioration in product appearance. The conventional polyester films are inferior to polyvinyl chloride films and polystyrene films in shrinkage finishing after being conveyed through a hot-air tunnel.

Furthermore, as the use of colored PET bottles is restricted in view of recycling, there has been increasing a demand of covering a large part of a side surface of each PET bottle with a label of heat-shrinkable polyester film, in place of coloring the bottle itself. However, the side surfaces of PET bottles have various shapes, and the outer diameters of the PET bottles are varied depending on their heights. Accordingly, a required degree of shrinkage is varied depending on which height a label is to be attached to the bottle. In view of the above, there is a demand for heat-shrinkable polyester films having superior shrinking properties to the conventional films and capable of providing excellent shrinkage finishing even in attaching the films to bottles having a complicated side surface configuration.

In view of the above, it is an object of the present invention to solve the problems residing in the conventional heat-shrinkable polyester films, and to provide heat-shrinkable polyester films suitable for production of labels which have an excellent shrinking property in a wide temperature zone from a low temperature to a high temperature, have no or less whitening, shrinkage shading, crinkling, distortion, uneven shrinkage in a direction orthogonal to the maximum shrinkage direction or the like, as well as to a process for producing the films.

SUMMARY OF THE INVENTION

The inventive heat-shrinkable polyester film (hereinafter, sometimes simply called as "the film") has a feature that the content of 1,4-cyclohexane dimethanol is 10 to 50% by mole based on a polyhydric alcohol component, and heat shrinkage factors (A), (B), and (C) of a 10 cm square sample of the film are 30 to 40%, 50 to 60%, and 65 to 77%, respectively: wherein (A) is a heat shrinkage factor of the square sample in a maximal shrinkage direction under the condition that the square sample is immersed in hot water of 75° C. for 10 seconds, and then in water of 25° C. for 10 seconds;

(B) is a heat shrinkage factor of the square sample in the maximal shrinkage direction under the condition that the square sample is immersed in hot water of 85° C. for 10 seconds, and then in water of 25° C. for 10 seconds; and (C) is a heat shrinkage factor of the square sample in the maximal shrinkage direction under the condition that the square sample is immersed in hot water of 95° C. for 10 seconds, and then in water of 25° C. for 10 seconds.

Use of the polyester having a specific composition is advantageous in providing a heat-shrinkable polyester film which has an excellent shrinking property in a wide temperature zone from a low temperature to a high temperature, minimizes generation of whitening, shrinkage shading, crinkling, distortion, uneven shrinkage in a direction orthogonal to the maximal shrinkage direction, or a like drawback, and particularly eliminates whitening after being conveyed through a hot-air tunnel.

According to another aspect of the present invention, the inventive heat-shrinkable polyester film has preferably an intrinsic viscosity of 0.66 dl/g or larger in the aspect of securing satisfactory shrink finishing appearance and improving tear resistance.

It is recommended that the inventive heat-shrinkable polyester film has a specific resistance in melting at 275° C. of $0.70 \times 10^8 \Omega \cdot cm$ or less in the aspect of improving productivity. Hereinafter, the specific resistance in melting is called as "melting specific resistance".

In addition, it is preferable that the above heat-shrinkable polyester film has a thickness distribution of 7% or lower, wherein the thickness distribution is calculated according to the following equation under the condition that a thickness variation in the maximal shrinkage direction of the film is measured with respect to a test piece of 50 cm in length and 5 cm in width:

thickness distribution=[(maximal thickness−minimal thickness)/average thickness]×100       (1)

The film having the thickness distribution satisfying the above requirement provides excellent print finishing particularly in printing a multi-color image, eliminates positional displacement in superposing colors one over the other, and provides satisfactory touch in handling.

According to yet another aspect of the present invention, it is preferable that the inventive film has a maximal heat shrinkage stress of 3.0 MPa or larger under the condition that a heat shrinkage test in the maximal shrinkage direction of the film is carried out in hot air of 90° C. with use of a test piece of 20 mm in width, and with a distance between corresponding chucks of 100 mm. The film having these properties provides particularly satisfactory shrink finishing appearance.

According to still another aspect of the present invention, provided is a process for producing the above heat-shrinkable polyester film by drawing the film at least in one direction. The method is characterized by: drawing the film in two or more stages; and drawing the film in the final drawing stage 3 to 6 times longer than the un-drawn film.

DETAILED DESCRIPTION

A heat-shrinkable polyester film of the present invention is obtained by using a single kind of copolyester or a mixture of two or more kinds of polyesters, wherein an ester unit composed of a known polybasic carboxylic acid and a polyhydric alcohol component is used as a primary constitutional unit. It is essential that the content of 1,4-cyclohexane dimethanol is 10 to 50% by mole based on the polyhydric alcohol component.

The inventive heat-shrinkable polyester film satisfies the requirements that heat shrinkage factors (A), (B), and (C) of a 10 cm square sample of the film are 30 to 40%, 50 to 60%, and 65 to 77%, respectively. Generally, in attaching a heat-shrinkable film label to a container by heat shrinkage, the container with the film label being placed thereon is conveyed through the hot-air tunnel wherein hot air of about 120 to 200° C., about 5 to 20 m/sec. in blowing velocity is blown in for about 2 to 20 seconds, or the steam tunnel wherein steam of about 75 to 95° C., about 0.5 to 20 MPa in pressure is blown in for about 2 to 20 seconds. The film satisfying all the heat shrinkage factors (A), (B), (C) in the aforementioned respective ranges can provide a satisfactory shrink finishing appearance under the generally practiced shrinking conditions even in use as a label for covering a large part of the side surface of a container such as a PET bottle having a complicated side surface configuration, or in use as a label for a container having such a side surface configuration that a very high shrinkage factor is locally required to cover the side surface of such a container.

If a film in which at least one of the heat shrinkage factors (A), (B), (C) is lower than the aforementioned corresponding range is attached to a container by heat shrinkage, particularly, under the condition that hot air is used as a heat source, shrinkage may be insufficient with the result that an end portion of the film is likely to have a zigzag shape. On the other hand, if a film in which, at least one of the heat shrinkage factors (A), (B), (C) is higher than the aforementioned corresponding range is attached to a container by heat shrinkage, particularly, under the condition that hot air is used as a heat source, there is a likelihood that the film may be displaced upwardly relative to the bottle by undesired sudden shrinkage, or an upper or a lower end of the film may be obliquely shrank or folded. Further, if a film in which the heat shrinkage factors (A) and (B) satisfy the aforementioned respective rangesm, and the heat shrinkage factor (C) is lower than the aforementioned corresponding range is attached to a container by heat shrinkage, particularly, under the condition that hot air is used as a heat source, whitening is likely to be generated.

A preferable heat shrinkage factor (A) is 31% or higher, more preferably 32%, and 39% or lower, more preferably 38% or lower. A preferable heat shrinkage factor (B) is 51% or higher, more preferably 52% or higher, and 59% or lower, more preferably 58% or lower. A preferable heat shrinkage factor (C) is 66% or higher, more preferably 67% or higher, and 76% or lower, more preferably 75% or lower.

"The heat shrinkage factor in the maximal shrinkage direction" means a heat shrinkage percentage in a direction along which shrinkage of a sample is largest. The maximal shrinkage direction is determined by the size of a square sample in lengthwise direction or widthwise direction (or oblique direction). The heat shrinkage factors (A), (B), (C) (unit: %) are obtained by immersing a 10 cm square sample in hot water of 75° C.±0.5° C., hot water of 85° C.±0.5° C., and hot water of 95° C.±0.5° C., respectively under no load for 10 seconds to induce heat shrinkage, immediately followed by immersion in water of 25° C.±0.5° C. under no load for 10 seconds, measuring the size of the sample in lengthwise and widthwise directions (or oblique direction), and implementing calculation according to the following equation:

heat shrinkage factor=100×(length before shrinkage−length after shrinkage)÷(length before shrinkage).

It is preferable that the inventive heat-shrinkable polyester film has a variation X in the heat shrinkage factor (A) of 10% or lower, wherein the variation X is obtained based on a difference in the heat shrinkage factor (A) before and after storage of the film at 40° C. for 160 hours. The variation X is expressed by the following equation (2):

X(%)=[heat shrinkage factor (%) before storage]−[heat shrinkage factor (%) after storage]       (2)

A large variation X in the heat shrinkable polyester film means that a heat shrinkage factor in a low temperature zone may be excessively lowered by storing the film at 40° C. for 160 hours. Generally, heat-shrinkable polyester films are stored in an environment from about 20 to 25° C. A film having a variation X of 10% or lower is advantageous in securing substantially the same shrink finishing appearance on a container as before storage even after a long-term storage of the film in such an environment. On the other hand, if a film having a variation X exceeding 10% is attached to a container by heat shrinkage after a long-term storage at an atmospheric temperature, it is highly likely that shrinkage unevenness or whitening may occur, particularly, under use of hot air as a heat source. In view of this, the variation X is preferably 7% or lower, and more preferably 5% or lower.

It is preferable that the inventive heat-shrinkable polyester film has an intrinsic viscosity of 0.66 dl/g or larger. The intrinsic viscosity is an index of the molecular weight of polyester (copolymer and/or a mixture thereof) constituting the film.

In attaching a film onto a container or the like by heat shrinkage, a shrinkage stress is exerted to the film. Suppressing undesirable reduction of a shrinkage stress with respect to shrinking time is effective in improving shrinkage defects such as shrinkage unevenness generated at an initial shrinking stage, thereby providing a satisfactory shrink finishing appearance. If a film having an intrinsic viscosity of lower than 0.66 dl/g is used, the molecular weight of polyester constituting the film is too low, and accordingly shrinkage stress is drastically reduced as time lapses. Thus, the defect observed at an initial shrinking stage cannot be eliminated, and shrinkage unevenness and whitening are unavoidable, thereby providing poor shrink finishing appearance.

Preferably, the inventive film has a satisfactory mechanical strength. As an index for such a satisfactory mechanical strength, it is preferable that the film has a rupture ratio of 10% or lower, wherein the rupture ratio is obtained by implementing a tensile test in a direction orthogonal to the maximal shrinkage direction of the film with respect to plural heat-shrinkable polyester films under the conditions: a distance between corresponding chucks of 100 mm, each test piece of 15 mm in width, a temperature of 23° C., and a drawing rate of 200 mm/min. The tensile test condition is in conformance to JIS K 7127.

The rupture ratio of 10% or lower means that the number of test pieces which is torn before being drawn by 5% relative to the un-drawn film is 10% (one-tenth) or lower relative to the total number of test pieces. The inventive heat-shrinkable polyester film has a feature that polyester molecules are oriented primarily in the maximal shrinkage direction. Generally, such a film is most likely to be torn along the oriented direction. Therefore, films which do not satisfy the above requirement are likely to suffer from a tear-related trouble based on a variation in tension force exerted to the film in such a step as printing, slitting, and adhesion of a solvent. In view of this, the less the number of test pieces having a rupture ratio of 5% or lower, the more the film having desirable properties is obtained. A rupture ratio of 0% is most preferable.

If a film has an intrinsic viscosity of lower than 0.66 dl/g, the molecular weight of polyester constituting the film is low, and the mechanical strength of the film is weak. Accordingly, it is likely that the rupture ratio of the film having an intrinsic viscosity of lower than 0.66 dl/g may exceed 10%. In view of this, a preferred intrinsic viscosity is 0.68 dl/g or larger, more preferably, 0.70 dl/g or larger.

If the intrinsic viscosity is too high, there is a tendency that the film formability in a film production step may be deteriorated. In view of this, an upper limit of the intrinsic viscosity is 1.5 dl/g, more preferably 1.3 dl/g. The intrinsic viscosity defined in the present invention is a value measured by the method used in below-mentioned examples.

The inventive heat-shrinkable polyester film has preferably a melting specific resistance of $0.70 \times 10^8 \Omega \cdot cm$ or less. The inventive film is generally produced by rendering a film-like molten polyester extruded out of an extruder into close contact with a casting roll by an electrostatic attraction force, and cool the molten polyester on the roll. If a film having a melting specific resistance exceeding $0.70 \times 10^8 \Omega \cdot cm$ is used, electrostatic attraction of the molten film to the casting roll is poor. As a result, the molten film may be brought in contact with the casting roll with air being locally remaining between the surface of the molten film and the surface of the casting roll, thereby generating so-called pinner bubbles on the film surface after the casting. Therefore, there is a need of reducing the film production speed to such a degree of sufficiently securing close contact of the molten film with the casting roll in order to suppress generation of pinner bubbles and to secure stable production. Such a measure may raise the production cost. In view of the above, the meting specific resistance is preferably $0.65 \times 10^8 \Omega \cdot cm$ or less, and more preferably $0.60 \times 10^8 \Omega \cdot cm$ or less.

The melting specific resistance defined in the present invention is a value measured by the method used in the below-mentioned examples.

It is preferable that the inventive film has a uniform thickness. It is recommended that a thickness distribution of the film defined by the following equation (1) is 7% or lower, wherein a variation in thickness in the maximal shrinkage direction of the film is measured with respect to a test piece of 50 cm in length and 5 cm in width:

$$\text{thickness distribution} = [(\text{maximal thickness} - \text{minimal thickness})/\text{average thickness}] \times 100 \quad (1)$$

The thickness distribution of the film is calculated according to the following procedure. Ten test pieces each having 50 cm in length, 5 cm in width, and the lengthwise direction as the maximal shrinkage direction are prepared. The thickness of each test piece in the lengthwise direction is continuously measured with use of a contact-type micro gauge (e.g. "KG60/A", product of Anritsu Corporation), and the measured thicknesses are outputted in terms of a chart. The maximal thickness, the minimal thickness, and the average thickness of each test piece are obtained based on the measurement results. The thickness distribution of each test piece is calculated according to the equation (1), and an average of the thickness distributions of the ten test pieces is obtained as the thickness distribution of the film.

If a film having a thickness distribution exceeding 7% is used, printability in a printing step, particularly in printing a multi-color image is poor, and it is highly likely that image displacement occurs in superposing colors one over the other. Also, in case of shaping a film into a tubular form by adhering one end of the film to the other end thereof with use of a solvent in order to produce labels from the film, it is difficult to adhere the one end of the film over the other end thereof. Further, if a film having a thickness distribution exceeding 7% is used, local difference in hardness is generated in a film roll in winding up the film into a roll in a film production step, thereby sagging or crinkling of the film is generated, which may make the film unusable. In view of this, the thickness distribution is preferably 6% or lower, and particularly preferably 5% or lower.

One of the primary reasons of varying the thickness distribution is a degree of electrostatic attraction of a film-like molten polyester to a casting roll in shaping the molten polyester into a film in a film production step. If the electrostatic attraction is poor, the thickness distribution of an undrawn film after the electrostatic contact with the casting roll becomes large. If such an undrawn film having a large variation in thickness distribution is drawn, a portion of the film having a small thickness is drawn greatly compared with a portion of the film having a large thickness, with the result that the drawn film has the varied thickness distribution being magnified. In view of this, it is preferable to keep the electrostatic contact in a satisfactory state in order to keep the thickness distribution of the film in the aforementioned range, and it is recommended to regulate the melting specific resistance in the abovementioned range.

Controllability of the thickness distribution may also be deteriorated in a drawing step. Accordingly, it is preferable to control drawing conditions such as preheating temperature, drawing temperature, and drawing ratio in the below-mentioned ranges to prevent such deterioration.

Further preferably, the inventive heat-shrinkable polyester film has a maximal heat shrinkage stress of 3.0 MPa or larger, wherein the maximal heat shrinkage stress is obtained by conducting a heat shrinkage test in the maximal shrinkage direction under the conditions of hot air of 90° C., test pieces each having 20 mm in width, and a distance between corresponding chucks at 100 mm. If the maximal heat shrinkage stress is less than 3.0 MPa, it is likely that attraction of the film to a container by heat shrinkage may be loosened due to an insufficient shrinkage stress, or the film may have a poor tear resistance due to an insufficient mechanical strength thereof. Preferably, the maximal heat shrinkage stress is 4.0 MPa or larger, and more preferably 6.0 MPa or larger.

The maximal heat shrinkage stress is measured according to the following steps.

(I) test pieces each having 200 mm in length and 20 mm in width are cut out from a heat-shrinkable film, wherein the lengthwise direction is set as the maximal shrinkage direction;

(II) the temperature in an oven of a tensile test apparatus (e.g. "TENSILON", product of Toyo Seiki Kabushild Kaisha) equipped with a hot-air blower oven is set at 90° C.;

(III) after suspending blowing of air, each test piece is placed in the oven in a state that a distance between chucks is set at 100 mm (fixed value);

(IV) the door of the oven is closed quietly, followed by resuming blowing of air (hot air at 90° C., blowing velocity at 5 m/sec., blowing from three directions, i.e., depthwise, leftward, and rightward directions), and the heat shrinkage stress is detected for measurement; and (V) a maximal value in a chart of the measurement results is determined as the maximal heat shrinkage stress (unit: MPa).

In the conventional heat-shrinkable polyester film, the heat shrinkage factor may be saturated depending on the composition of the polyester constituting the film in the case where the film is heated up to a certain temperature in the heat shrinking step, and no more shrinkage is obtainable by further heating beyond the certain threshold temperature. Such a film may have an advantage that it is heat-shrinkable at a relatively low temperature. However, if such a film is passed through the hot-air tunnel for heat shrinkage, or subjected to heat shrinkage after a long-term storage at an ambient temperature of not lower than normal temperature, the aforementioned whitening may likely to appear on the film. It is conceived that whitening results from a phenomenon that molecular chains of polyester are partially crystallized, and a refractive index of light at a crystallized portion is differentiated from a refractive index of light at a non-crystallized portion.

The present inventors have found that such whitening can be suppressed by setting the content of 1,4-cyclohexane dimethanol at 10% or larger by mole based on a polyhydric alcohol component.

If the content of 1,4-cyclohexane dimethanol exceeds 50% by mole, it is highly likely that the shrinkage factor of the resultant film may be too large and that positional displacement of labels or distortion of printed design may occur in a heat shrinking step. In addition to these drawbacks, since the resultant film has a low resistance to a solvent, whitening may appear on the film in a printing step due to existence of an ink solvent (such as ethyl acetate), or tear resistance of the film may be lowered.

Further, as will be described later in detail, it is desirable that the inventive heat-shrinkable polyester film contains an ethylene terephthalate unit as a primary constitutional unit in order to provide the film with desirable tear resistance, mechanical strength, heat resistance, and the like. 1,4-cyclohexane dimethanol is added to suppress crystallization of the film, i.e., to enhance a degree of non-crystallization so as to provide the film with higher heat shrinkability.

On the other hand, if the content of 1,4-cyclohexane dimethanol is lower than 10% by mole based on a polyhydric alcohol component, there is a likelihood that insufficient shrinkage, or whitening based on partial crystallization may appear because crystallization of the film is accelerated due to an excessive existence of ethylene terephthalate unit. Furthermore, such a low content of 1,4-cyclohexane dimethanol may exceedingly raise resistance to a solvent, with the result that adhesion failure may occur in shaping the film into a tubular form by adhesion with a solvent such as tetrahydrofuran or 1,3-dioxolane. In view of this, it is recommended that the content of 1,4-cyclohexane dimethanol based on the polyhydric alcohol component is 12% or more by mole, more preferably 14% or more by mole, and 45% or less by mole, more preferably 40% or less by mole.

Ethylene glycol is used as other polyhydric alcohol constituting the polyhydric alcohol component to form an ethylene terephthalate unit, as will be described later. It is possible to use alkylene glycols such as propylene glycol, triethylene glycol, 1,4-butanediol, 1,6-hexanediol, 3-methyl-1,5-pentanediol, neopentyl glycol, 2-methyl-1,5-pentanediol, 2,2-diethyl-1,3-propanediol, 1,9-nonanediol, 1,10-decanediol: trimethylol propane; glycerin; pentaerythritol; diethylene glycol; dimer diol; polyoxytetramethylene glycol; polyethylene glycol; alkylene oxide addition products of bisphenol compounds or derivatives thereof, in addition to ethylene glycol.

It is also possible to partially use lactones represented by ε-caprolactone as a raw material despite that lactones do not belong to polyhydric alcohol components. Lactones become a unit in which a ring is opened with opposite ends thereof having an ester bond. It is conceived that a unit derived from one lactone constitutes a carboxylic acid component and an alcohol component. Therefore, in case of using lactones, the content of 1,4-cyclohexane dimethanol is calculated based on a presumption that the sum of the content of the polyhydric alcohol component and the content of the units derived from lactones is 100% by mole. Likewise, the content of the polybasic carboxylic acid is calculated based on a presumption that the sum of the content of the polybasic carboxylic acid and the content of the units derived from lactones is 100% by mole.

Considering tear resistance, mechanical strength, heat resistance, and the like of the heat-shrinkable polyester film, it is preferable to select the components of the film such that the content of the ethylene terephthalate unit is 50% or larger by mole based on the constitutional units of the film. Accordingly, it is preferable that the content of terephthalic acids (component consisting of terephthalic acid or esters thereof) is 50% or larger by mole based on the polybasic carboxylic acid component, and that the content of ethylene glycol is 50% or larger by mole based on the polyhydric alcohol component. Preferably, the content of ethylene terephthalate units is 55% or larger by mole, and more preferably, 60% or larger by mole.

In the present invention, since the content of 1,4-cyclohexane dimethanol is 10% or more by mole based on the polyhydric alcohol component, the content of ethylene glycol is 90% or less by mole based on the polyhydric alcohol component.

Aromatic dicarboxylic acids, esterified derivates thereof, aliphatic dicarboxylic acids or the like may be usable as the polybasic carboxylic acids for forming polybasic carboxylic acid component, in addition to terephthalic acid (and esters thereof). Examples of aromatic dicarboxylic acids are isophthalic acid, naphthalene-1,4- or -2,6-dicarboxylic acid, and 5-sodium sulfoisophthalic acid. Examples of esterified derivatives of these aromatic dicarboxylic acids and terephthalic acid are derivatives such as dialkylesters and diarylesters. Examples of aliphatlic dicarboxylic acids are glutaric acid, adipic acid, sebacic acid, azelaic acid, oxalic acid, succinic acid, as well as aliphatic dicarboxylic acids generally called as dimer acid. Oxycarboxylic acids such as p-oxybenzoic acid, and polybasic carboxylic acids such as trimellitic anhydride or pyromellitic anhydride may be added, if necessary.

Preparing the film having the aforementioned composition and carrying out drawing under the below-mentioned condition makes it possible to produce the inventive heat-shrinkable polyester film in which the heat shrinkage factors (A), (B), (C), the variation (X) of the heat shrinkage factor (A) defined in the equation (2), and the maximal heat shrinkage stress fall within the abovementioned respective ranges.

It is preferable to produce the film primarily composed of ethylene terephthalate units and to introduce a unit of lowering a glass transient temperature (Tg) by about 0.5 to 30% by mole based on the total content of the constitutional units of the film, in addition to the ester unit composed of 1,4-cyclohexane dimethanol and any one of the polybasic carboxylic acid components in order to facilitate control of the heat shrinkage factors (A), (B), (C). Preferred examples of the unit of lowering the Tg are: an ester unit containing 1,3-propanediol, 1,4-butanediol, dimer diol, or polyoxytetramethylene glycol, as the polyhydric alcohol component; an ester unit containing an aliphatic dicarboxylic acid such as dimer acid, adipic acid, sebacic acid, and azelaic acid, as the polybasic carboxylic acid component; and a unit derived from ε-caprolactone. One or two or more kinds thereof may be introduced. Further alternatively, the ester unit may be composed of one of the polyhydric alcohol components and one of the polybasic carboxylic acid components.

It is also preferable to introduce the unit of lowering the Tg by about 0.5 to 30% by mole based on the total content of the constitutional units of the film to facilitate control of the variation X of the heat shrinkage factor (A) defined in the equation (2). Particularly recommended units of lowering the Tg are an ester unit containing 1,4-butanediol, dimer diol, or polyoxytetramethylene glycol as the polyhydric alcohol component, and an ester unit containing dimer acid as the polybasic carboxylic acid component among the aforementioned ester units in the aspect of feasibility in controlling the heat shrinkage factors (A), (B), (C).

An alkaline earth metal compound and a phosphorus compound may be contained in the inventive heat-shrinkable polyester film to regulate the melting specific resistance within the aforementioned range. An alkaline earth metal atom ($M^2$) in the alkaline earth metal compound has a property of lowering the melting specific resistance of the film. The alkaline earth metal compound is generally used as a catalyst in generating esters from polybasic carboxylic acids and polyhydric alcohols. Adding the alkaline earth metal compound beyond a required amount as the catalyst is advantageous in lowering the melting specific resistance. Specifically, it is recommended that the content of the alkaline earth metal compound based on $M^2$ is 40 ppm or more (in terms of mass, hereinafter, the unit is the same), preferably 50 ppm or more, and more preferably 60 ppm or more. On the other hand, it is recommended that the content of the alkaline earth metal compound based on $M^2$ is 400 ppm or less, preferably 350 ppm or less, and more preferably 300 ppm or less. Use of the alkaline earth metal compound beyond the upper limit fails to provide such an effect as expected by increase of the amount. To make the matter worse, drawbacks are increased such as generation of foreign matters and coloring resulting from excessive existence of the compound.

Preferred examples of the alkaline earth metal compound are hydroxides, aliphatic dicarboxylates (such as acetate and butyrate, preferably acetate), aromatic dicarboxylates, salts with a compound having a phenolic hydroxyl group (such as salts with phenol). Examples of the alkaline earth metal are magnesium, calcium, strontium, and barium (preferably, magnesium). Specific examples are magnesium hydroxide, magnesium acetate, calcium acetate, strontium acetate, and barium acetate. Among these, magnesium acetate is preferably used.

A phosphorus compound does not have an action of lowering the melting specific resistance by itself, but is effective in lowering the melting specific resistance by combined use with the alkaline earth metal compound, and an alkali metal compound which will be described later. Although a reason for such an effect has not been elucidated, it is conceived that containing a phosphorus compound is effective in suppressing generation of foreign matters and in increasing the quantity of charge carriers. It is recommended that the content of the phosphorus compound based on phosphorous atom (P) is 60 ppm (in terms of mass, hereinafter, the unit is the same) or more, preferably 65 ppm or more, and more preferably 70 ppm or more. Use of a phosphorus compound below the lower limit fails to provide a sufficient effect in lowering the melting specific resistance, and may likely to increase generation of foreign matters.

On the other hand, it is recommended that the content of the phosphorus compound based on P is 500 ppm or less, preferably 450 ppm or less, and more preferably 400 ppm or less. Use of the phosphorus compound above the upper limit fails to provide such an effect as expected by increase of the amount. To make the matter worse, generation of diethylene glycol may be accelerated with the result that physical properties of the film may be deteriorated.

Examples of the phosphorus compound are phosphoric acids such as phosphoric acid, phosphorous acid, hypophosphorous acid, and esters thereof (such as alkyl ester and aryl ester). Examples of preferred phosphorus compounds are phosphoric acid, aliphatic esters of phosphoric acids (trialkyl phosphates such as trimethyl phosphate and triethyl phosphate), and aromatic esters of phosphoric acid (triaryl phosphates such as triphenyl phosphate and tricresyl phosphate). Among these, aliphatic esters of phosphoric acid are particularly preferred.

It is preferable to contain an alkaline earth metal atom ($M^2$) and a phosphorous atom (P) in a mass ratio ($M^2/P$) from 1.2 to 5.0, so that a desirable amount of an alkaline earth metal compound and a phosphorus compound are contained in the film. If $M^2/P$ is lower than 1.2, an effect of lowering the melting specific resistance is exceedingly reduced. Accordingly, M2/P is preferably not lower than 1.3, and more preferably not lower than 1.4. On the other hand, if $M^2/P$ exceeds 5.0, drawbacks such as accelerated formation of foreign matters and coloring of film are intolerable beyond the effect of lowering the melting specific resistance. In view of this, $M^2/P$ is preferably not higher than 4.5, and more preferably not higher than 4.0.

It is preferable to contain an alkali metal compound in the film to further lower the melting specific resistance of the film, in addition to the alkaline earth metal compound and the phosphorus compound. The alkali metal compound does not have an action of lowering the melting specific resistance of the film by itself. However, combined use of the alkali metal compound with the alkaline earth metal compound and the phosphorus compound is effective in remarkably lowering the specific melting resistance of the film. Although a specific reason for such an effect has not been elucidated, it is conceived that the three components, i.e., the alkali metal compound, the alkaline earth metal compound, and the phosphorus compound constitute a complex compound, which contributes to lowering of the melting specific resistance.

It is recommended that the content of the alkali metal compound based on an alkali metal ($M^1$) is not lower than 5 ppm (in terms of mass, hereinafter, the unit is the same), preferably not lower than 6 ppm, and more preferably not lower than 7 ppm. On the other hand, an excessive content of the alkali metal compound does not contribute to lowering of the melting specific resistance, and may result in accelerated generation of foreign matters. In view of this, it is recommended that the content of the alkali metal compound based on $M^1$ is not higher than 100 ppm, preferably not higher than 90 ppm, and more preferably not higher than 80 ppm.

Examples of the alkali metal compound are hydroxides, carbonates, aliphatic dicarbonates (such as acetates and butyrates, preferably, acetates), aromatic dicarbonates (such as benzoates), and salts with a compound having a phenolic hydroxyl group (such as salts with phenol). Examples of the alkali metal are lithium, sodium, and potassium (preferably, sodium). More specifically, lithium hydroxide, sodium hydroxide, potassium hydroxide, lithium carbonate, sodium carbonate, potassium carbonate, lithium acetate, sodium acetate, and potassium acetate are preferred examples of the alkali metal compound. Among these, sodium acetate is particularly preferred.

Polyester constituting the inventive heat-shrinkable polyester film can be produced by melting polymerization according to a conventional method. Examples of the conventional method are a so-called direct polymerization in which dicarboxylic acids and glycols are directly reacted with each other, and the resultant oligomer is subjected to polycondensation, and a so-called trans-esterification in which dimethylesters of dicarboxylic acid and glycols are subjected to trans-esterification, followed by polycondensation. An arbitrary production method is usable. Alternatively, polyester producible by the other polymerization method may constitute the inventive heat-shrinkable polyester film. Introduction of the unit derived from lactones may be achieved by, e.g., a method further comprising a polycondensation step by addition of lactones prior to the aforementioned polycondensation, or a method comprising a step of co-polymerizing lactones and polymer obtained by the aforementioned polycondensation.

A known conventional catalyst for polymerization is used in polymerization of polyester. Generally, metal compounds such as a titanium compound, an antimony compound, a germanium compound, a tin compound, a cobalt compound, and a manganese compound are used as the catalyst. Among these, a titanium compound, an antimony compound, and a germanium compound, specifically, titanium tetrabutoxide, antimony trioxide, and germanium dioxide are particularly preferred.

The time of adding the alkali metal compound, the alkaline earth metal compound, and the phosphorus compound is not specifically limited, as far as the addition is conducted during the polyester polymerization process. The addition may be carried out in any step, i.e., before esterification, during esterification, during the period after completion of esterification and before start of polymerization, during polymerization, and after polymerization. Preferably, the addition is carried out after completion of esterification, and more preferably, during the period after completion of esterification and before start of polymerization. If the alkali metal compound is added after completion of esterification, generation of foreign matters resulting from the alkali metal compound or the alkaline earth metal compound can be reduced.

Also, fine particles, such as silica, titanium oxide, kaolin, calcium carbonate, or a like component may be added to the components of the film, and an antioxidant, a UV absorbent, an antistatic agent, a colorant, an antibacterial agent, or a like component may be added according to needs.

Polyester film can be obtained by the below-mentioned known method. There are proposed two techniques of causing the heat-shrinkable polyester film to contain plural components: one is a technique in which copolymerization is carried out, and the obtained copolyester is used singly; and the other is a technique in which homopolyesters of different kinds are blended with each other, or copolyester is blended with homopolyester or copolyester of different kind.

In the case of using copolyester singly, copolyester containing the polyhydric alcohol component having the above specific composition is used. In case of blending polyesters having different compositions with each other, the property of the film can be easily altered by merely changing the blending ratio of the polyesters. Use of the latter technique is preferred because the latter technique can be applied to industrial production of a variety of kinds of films.

Drawbacks such as whitening of a film resulting from poor miscibility do not occur even if homopolyesters of different compositions or homopolyester and copolyester are blended with each other. This is because trans-esterification is proceeded between the homopolyesters of different compositions or between the homopolyester and the copolyester under a heated state of the raw material polyesters during a melting/kneading step in an extruder, which will be described later, and it is highly likely that the mixture may be turned into a copolyester mixture having substantially the same composition. Such a transition can be confirmed because there is observed only a single peak with respect to the Tg of the film.

A specific method for producing the inventive film comprises steps of drying raw material polyester chips with use of a dryer such as a hopper dryer or a paddle dryer, or a vacuum dryer, and extruding the chips into a film-like molten polyester with use of an extruder in a temperature ranging from 200 to 300° C., or comprises a step of extruding un-dried raw material polyester chips into a film-like molten polyester while removing water components in a vented extruder. A known technique such as extrusion provided with a T-die or tubular extrusion is applicable. After the extrusion, the film-like molten polyester is brought into contact with a casting roll while cooling the film rapidly on the casting roll to thereby obtain an undrawn film.

According to the present invention, an electrode is arranged at a certain position on a path from the extruder to the casting roll, and a voltage is applied between the electrode and the casting roll to electrostatically attract the film to the casting roll.

Next, the undrawn film is drawn. It is important to select appropriate drawing conditions, which will be defined below, to control the heat shrinkage factors (A), (B), (C) of the heat-shrinkable polyester film, and the film thickness distribution defined by the above equation (1) in the above-mentioned respective ranges. If the film is produced under the below-mentioned drawing conditions that-satisfy the heat-shrinkage factors (A), (B), (C), it is also possible to regulate the variation X of the heat shrinkage factor (A) defined by the equation (2), and the maximal heat shrinkage stress in the above-mentioned respective ranges.

It is practical to set the widthwise (transverse) direction of the film as the maximal shrinkage direction in the aspect of securing production efficiency. Accordingly, in the following, illustrated is an example of drawing the film, wherein the widthwise direction of the film is defined as the maximal shrinkage direction. It should be noted that the film can be drawn in the lengthwise direction of the film, wherein the lengthwise direction is set as the maximal shrinkage direction by performing a general operation such as changing the drawing direction by 90° in the following method.

It is necessary to carry out a preheating step prior to the drawing step in drawing the un-drawn film in the widthwise direction thereof with use of a tenter or an equivalent device in order to achieve uniformity in the heat-shrinkage polyester film thickness distribution. In the preheating step, it is preferred that heating is carried out with such a low air blowing velocity that the surface temperature of the film lies within a temperature from Tg+0° C. to Tg+60° C., so that the heat conductivity coefficient is not higher than 0.00544J/cm$^2$·sec·° C.(0.0013 cal/cm$^2$·sec·° C.).

The film is drawn in the widthwise direction thereof in a temperature range from Tg−20° C. to Tg+40° C. It is required to carry out two or more drawing stages, preferably three or more drawing stages, so that the film after the final drawing stage is drawn 3 to 6 times, preferably 3.5 to 5.5 times, longer than the undrawn film to set the heat shrinkage factors (A), (B), (C) in the aforementioned respective ranges. For instance, in the case of carrying out the drawing by three stages, in the first drawing stage, the film is drawn by 1.1 to 1.5 times longer than the undrawn film; in the second drawing stage, the film is drawn by 1.3 to 1.7 times longer than the film after the first drawing stage; and the film is drawn by 1.5 to 2.5 times longer than the film after the second drawing stage, so that the final drawing ratio of the film lies within the above range.

It is preferable to set the drawing temperature in the second drawing stage or thereafter substantially identical to the drawing temperature or lower by about 1 to 10° C. than the drawing temperature in one stage before the relevant stage. In the latter case of lowering the drawing temperature by about 1 to 10° C., it is recommended to set a difference in temperature between the drawing start time (first drawing stage) and the drawing end time (final drawing stage) from 5 to 20° C. It is preferred to increase the number of stages in the drawing step in the aspect of controlling heat shrinkage efficiency of the mm. However, an excessive increase in the number of drawing stages may complicate the designing of the drawing facility in industrial production of the film. In view of this, it is desirable to provide 6 or less drawing stages, preferably, 4 or less drawing stages.

After the drawing step, the drawn film is subjected to heat treatment in a temperature ranging from 50° C. to 110° C. while drawing the film by 0 to 15% or relaxing the film by 0 to 15%, and to further heat treatment in a temperature ranging from 40° C. to 100° C. according to needs, whereby the heat-shrinkable polyester film is obtained. In case of performing the heat treatment step while drawing the film, it is preferable to set the final drawing ratio of the film considering the drawing ratio in the heat treatment step, so that the final drawing ratio satisfies the above range relative to the undrawn film.

In the step of drawing the film in the widthwise direction thereof, it is preferable to use a facility capable of minimizing a variation in the film surface temperature. Specifically, there are provided many processes in the drawing step such as preheating before drawing, drawing, heat treatment after drawing, relaxation, and re-drawing. Particularly, in the preheating step, various drawing stages in the drawing step, and the heat treatment step after the drawing step, it is preferable to regulate a variation in the film surface temperature, which has been measured at an arbitrary location on the film, within the average temperature±1° C., preferably within the average temperature±0.5° C. The variation in the film surface temperature is set within the above range because the drawing and heat treatment steps are carried out substantially at the temperature identical to each other over the entirety of the film, and accordingly, heat shrinkage behavior becomes uniform.

A variation in the film surface temperature can be minimized by, for example, using an inverter-equipped facility capable of suppressing variation in air blowing velocity so as to control the blowing velocity of hot air for heating the film, or using a facility capable of suppressing a variation in hot air temperature with use of low-pressure steam of not higher than 500 kPa (5 kgf/cm$^2$) as a heat source.

It is possible to draw the film in the lengthwise direction thereof by 1.0 to 4.0 times, preferably, 1.1 to 2.0 times longer than the undrawn film in addition to the widthwise drawing, in place of uni-axially drawing the film only in the widthwise direction thereof with use of a tenter. In case of performing bi-axial drawing, bi-axial drawing can be performed sequentially or simultaneously. Further, re-drawing may be performed according to needs. In the sequential bi-axial drawing, the film can be drawn in the order of lengthwise-and-widthwise directions, widthwise-and-lengthwise directions, lengthwise-widthwise-lengthwise directions, widthwise-lengthwise-widthwise directions, or in other arbitrary combined order. In case of adopting the lengthwise drawing step or the bi-axial drawing step, similar to the widthwise drawing step, it is preferred to minimize a variation in the film surface temperature in the preheating step, drawing step, or a like step.

It is preferable to set the heat conductivity coefficient in the drawing step not lower than 0.00377 J/cm$^2$·sec·° C. (0.0009 cal/cm$^2$·sec·° C.), preferably in the range from 0.00544 to 0.00837 J/cm$^2$ sec·° C. (in the range from 0.0013 to 0.0020 cal/cm$^2$·sec·° C.) in suppressing the internal exothermal action of the film accompanied by the drawing and in minimizing temperature spots appearing in the widthwise direction of the film.

The thickness of the inventive heat-shrinkable polyester film is not specifically limited. However, 10 to 200 µm is preferable, and 20 to 100 µm is more preferable as the thickness of the inventive film for labels.

EXAMPLES

In the following, the present invention is described in detail with Examples, which, however, do not limit the present invention. Adequate modification is allowable as far as it does not depart from the object of the present invention described above or below, and every such modification is intended to be embraced in the technical scope of the present invention. The measuring methods of the properties of chips produced by synthesis examples, and films obtained by Examples and Comparative Examples are as follows.

(1) Composition

A sample solution was prepared by dissolving a chip or a film in a solvent containing chloroform D (product of Euriso-top) and trifluoroacetic acid D1. (product of Euriso-top) at a ratio of 10:1 (mass ratio), and proton NMR of the resulting sample solution was measured by NMR ("GEMINI-200", product of Varian) under a condition of a temperature of 23° C. and of an integration number of 64. In the NMR measurement, the composition ratio of the components constituting the film was calculated based on peak intensities of the predetermined protons.

(2) Metal Component

The amounts of Na, Mg, P contained in the sample (chip or film) were measured according to the below-mentioned method.

[Na]

2g of the sample was put in a crucible of platinum, and incinerated at a temperature from 500 to 800° C. Thereafter, the incinerated substance was subjected to evaporation and dried into solid by addition of 5 mL of hydrochloric acid (concentration: 6 mol/L). The obtained residues were dissolved in 10 mL of hydrochloric acid in a concentration of 1.2 mol/L, and the concentration of Na was measured with use of an atomic absorption spectrophotometer ("AA-640-12", product of Shimadzu Corporation) based on a calibration curve.

[Mg]

2g of the sample was put in a crucible of platinum, and incinerated at a temperature from 500 to 800° C. Thereafter, the incinerated substance was subjected to evaporation and dried into solid by addition of 5 mL of hydrochloric acid (concentration: 6 mol/L). The obtained residues were dissolved in 10 mL of hydrochloric acid in a concentration of 1.2 mol/L, and the concentration of Na was measured with use of an inductively-coupled plasma (ICP) spectrophotometer ("ICPS-200", product of Shimadzu Corporation) based on a calibration curve.

[P]

Orthophosphoric acid was derived from the phosphorous component in the sample by either one of the following three methods G) through (iii). The orthophosphoric acid and molybdate were reacted with each other in sulfuric acid (concentration: 1 mol/L). After yielding phosphomolybdic acid, hydrazine sulfate was added to reduce. The concentration heteropoly acid salt (blue) obtained by the reduction was calculated by measuring the absorbance of the substance at 830 nm with use of an absorption spectrophotometer ("UV-150-02", product of Shimadzu Corporation) based on a calibration curve.

(i) dry-incinerating the sample and sodium carbonate in a crucible of platinum;

(ii) wet-decomposing in a reaction system of sulfuric acid, nitric acid, and perchloric acid; and (iii) wet-decomposing in a reaction system of sulfuric acid and perchloric acid (3) Intrinsic Viscosity 0.1 g of the sample (chip or film) was weighed, and dissolved in a solvent of 25 ml containing phenol and tetrachloroethane at a ratio of 3:2 (mass ratio). Thereafter, the viscosity of the solvent was measured with use of an Ostwald viscometer at 30±0.1° C. The intrinsic viscosity [η] was obtained based on the following equation (Huggins equation).

$$|\eta| = \lim_{C \to 0} \frac{\eta_{sp}}{C}$$

$$\frac{\eta_{sp}}{C} = |\eta| + k|\eta|^2 C$$

$$\eta_{sp} = \frac{t - t_0}{t_0}$$

where $\eta_{sp}$ represents a specific viscosity, $t_0$ represents a time when the solvent was dropped with use of the Ostwald viscometer, t represents a time when the film-containing solution was dropped with use of the Ostwald viscometer, and C represents a concentration of the film-containing solution.

It should be noted that the intrinsic viscosity was calculated based on the following approximation equation in which k=0.375 was used in the Huggins equation.

$$\eta_r = \eta_{sp} + 1 = \frac{t}{t_0}$$

$$[\eta] = \frac{1}{1.6}\{(\eta_r - 1) + 3 \times \ln \eta_r\}$$

where $\eta_r$ represents a relative viscosity.

(4) Content of solid residue (foreign matters)

2 g of the sample (chip or film) was dissolved in 100 mL-solution containing phenol and tetrachloroethane in a ratio of 3:2 (mass ratio). Thereafter, the solution was filtrated in a membrane filter (pore diameter: 0.1 μm) of teflon to yield solid residues. The solid residues were evaluated visually based on the following criteria.

None: no solid was observed on the membrane filter after filtration.

Very few: solid was observed locally on the membrane after filtration.

Much: solid was observed substantially on the entire surface of the membrane filter.

(5) Melting Specific Resistance

A pair of electrodes were placed in a melting sample (chip or film) at 275° C., and a voltage of 120V was applied to the electrodes. An electric current flowing through the electrodes at the application of the voltage was measured, and a melting specific resistance Si (unit: Ω·cm) was calculated based on the following equation.

$$Si = (A/I) \times (V/io)$$

where A represents an area of the electrode (unit: $cm^2$), I represents a distance between the electrodes (unit: cm), V represents a voltage (unit: V), and io represents an electric current (unit: A).

(6) Casting

An electrode in the form of a tungsten wire was arranged between the T-die of the extruder and the casting roll under control of the surface temperature at 30° C., and a voltage ranging from 7 to 10 kV was applied between the electrode and the casting roll. Molten resin was extruded from the T-die at 280° C. to yield a film, and the extruded film was brought into contact with the electrode. After the contact, the film was cooled while being conveyed on the casting roll to produce a film of 180 μm in thickness (casting velocity: 30 m/min.). Pinner bubbles generated on the film surface were observed visually, and generation of pinner bubbles was evaluated based on the following criterion.

○: no pinner bubble was generated.

Δ: generation of pinner bubbles was observed locally.

×: generation of pinner bubbles was observed greatly.

(7) Heat Shrinkage Factor

The film was cut into square samples each in a size of 10 cm×10 cm. The square samples were immersed in hot water of the following respective temperatures (A), (B), (C) under no load for 10 seconds for heat shrinkage. Thereafter, the square samples were immersed in water of 25° C.±0.5° C. for 10 seconds, and the heat shrinkage factors were calculated based on the following equation by measuring the sizes of each square sample in lengthwise and widthwise directions:

Heat shrinkage factor (%)=100×(length before shrinkage−length after shrinkage)÷(length before shrinkage).

In the above, the temperature (A) is 75° C.±0.5° C., the temperature (B) is 85° C.±0.5° C., and the temperature (C) is 95° C.±0.5° C. The direction along which shrinkage of a sample is largest is defined as the maximal shrinkage direction. The heat shrinkage factor with respect to a film which has been stored at 40° C. for 160 hours was also obtained with use of the hot water of the temperature (A), and the variation X (unit: %) of the heat shrinkage factor was calculated based on the equation (2).

(8) Tear Resistance (Rupture Ratio)

A tensile test was performed in a direction orthogonal to the maximal shrinkage direction of the film before heat shrinkage according to JIS K 7127. The test was carried out under the conditions: the number of test pieces of 20, each test piece having 200 mm in length, a distance between corresponding chucks of 100 mm, each test piece having 15 mm in width, a temperature of 23° C., and a drawing rate of 200 mm/min. The number of test pieces which were torn before the drawing by 5% or less was counted, and the percentage (%) of the torn test pieces relative to all the test pieces (20 pieces) was calculated as a rupture ratio (unit: %).

(9) Maximal Heat Shrinkage Stress

The maximal heat shrinkage stress was measured by a tensile test apparatus ("TENSILON", product of Toyo Seild Kabushiki Kaisha) equipped with an oven. A sample having 200 mm in the maximal shrinkage direction and 20 mm in width was cut from the film before heat shrinkage. Operation of the air blower oven of the tensile test apparatus which has been preheated at 90° C. was suspended, and then, the sample was placed in the oven with a distance between corresponding chucks of 100 mm. After placing the sample in the oven, the door of the oven was promptly closed. A heat shrinkage stress was detected at the start time of feeding hot air (hot air at 90° C., blowing velocity at 5 m/sec. blowing from three directions, i.e., depthwise, leftward, and rightward directions), and the maximal value obtained from the measurement chart was set as the maximal heat shrinkage stress (unit: MPa).

(10) Thickness Distribution 10 test pieces each having 50 cm in length, 5 cm in width, and lengthwise direction as the maximal shrinkage direction were prepared. The thickness of each test piece in the lengthwise direction was continuously measured with use of a contact-type micro gauge (e.g. "KG60/A", product of Anritsu Corporation), and the measurement results were outputted as a chart. The maximal thickness, the minimal thickness, and the average thickness of each test piece were obtained from the measurement results, a thickness distribution of each test piece was calculated based on the equation (1), and the average value of the thickness distributions of the ten test pieces was set as the thickness distribution of the film.

(11) Shrinkage Finishing

The film was shaped into a tube by adhering the opposite ends thereof by heat seal. The resultant tubular film was cut into heat-shrinkable polyester film labels. After attaching the labels on respective glass bottles of 300 ml in capacity, the bottles attached with the labels were passed through a hot-air tunnel of air temperature at 170° C. and blowing velocity at 12 m/sec. for heat shrinkage of the labels. Judgment as to whitening, shrinkage shading, and defects on the end portion of the labels (such as folding or zigzag shape) was made visually, and the shrinkage finishing was evaluated based on 5 scales. The scale 5 indicates excellent finishing, the scale 4 indicates good finishing, the scale 3 indicates that a few defects such as whitening, shrinkage shading, or a defective end portion of the label are observed (two or less sites), the scale 2 indicates that several defects such as whitening, shrinkage shading, or a defective end portion of the label are observed (3 to 5 sites), and the scale 1 indicates quite a few defects such as whitening, shrinkage shading, or a defective end portion of the label are observed (six or more sites). The label evaluated as the scale 4 or 5 is determined as PASSED, and the label evaluated as the scale 3, 2 or 1 is determined as FAILED.

Synthesis Example 1

Into a reactor for esterification, charged were 57036 parts by mass of terephthlic acid, 35801 parts by mass of ethylene glycol, and 15843 parts by mass of 1,4-cyclohexane dimethanol. Esterification was carried out under the conditions: pressure of 0.25 MPa, temperature from 220 to 240° C. for 120 minutes. Then, the reactor was brought to a normal pressure, and additionally charged into the reactor were 6.34 parts by mass of cobalt acetate tetrahydrate (catalyst for polymerization), 8 parts by mass of titanium tetrabutoxide (catalyst for polymerization), 132.39 parts by mass of magnesium acetate tetrahydrate (alkaline earth metal compound), and 61.5 parts by mass of trimethylphosphate (phosphorus compound). After the addition, the mixture was stirred for 10 minutes, and the reaction system was gradually depressurized to bring the pressure in the reactor to 0.5 hPa within 75 minutes, while raising the temperature to 280° C. Stirring was continued to carry out polymerization until the melting viscosity becomes 7000 poise at 280° C. (for about 40 minutes). Thereafter, the resultant polymerized substance was ejected into strand in water to cool. The obtained strand was cut into chips of polyester A with use of a strand cutter.

Synthesis Examples 2 to 6

Chips of polyester B through F as shown in Table 1 and Table 2 were obtained according to the same manner as obtaining the chip A in synthesis example 1.

TABLE 1

| | | chip A | chip B | chip C | chip D | chip E | chip F |
|---|---|---|---|---|---|---|---|
| Polybasic carboxylic acid component (mole %) | TPA | 100 | 100 | 100 | 100 | 91 | 95 |
| | DiA | — | — | — | — | — | 5 |

TABLE 1-continued

|  |  | chip A | chip B | chip C | chip D | chip E | chip F |
|---|---|---|---|---|---|---|---|
| Polyhydric alcohol component (mole %) | CHDM | 32 | — | — | — | 16 | 15 |
|  | EG | 67 | 67 | 99 | — | 63 | 84 |
|  | NPG | — | 32 | — | — | — | — |
|  | BD | — | — | — | 100 | 11 | — |
|  | DEG | 1 | 1 | 1 | — | 1 | 1 |
| ε-CL unit(mole %) |  | — | — | — | — | 9 | — |
| Alkali metal $M^1$ (ppm) | Na | — | 20 | — | — | 20 | 18 |
| Alkaline earth metal $M^2$ (ppm) | Mg | 180 | 180 | 81 | 39 | 130 | 151 |
| P (ppm) |  | 26 | 18 | 58 | 0 | 65 | 64 |
| Mass ratio ($M^2$/P) |  | 6.92 | 10.0 | 1.40 | — | 2.00 | 2.36 |

In Table 1, the contents of the inorganic components (Na, M, P) are represented in terms of the concentrations of the respective corresponding atoms (unit: ppm, based on mass) The respective inorganic components are derived from the following compounds.

Na: mainly derived from sodium acetate (alkali metal compound)

Mg: mainly derived from magnesium acetate tetrahydrate

P: mainly derived from trimethylphosphate

In Table 1, TPA represents terephthalic acid, DiA represents dimer acid, EG represents ethylene glycol, CHDM represents 1,4-cyclohexane dimethanol, NPG represents neopentyl glycol, BD represents 1,4-butanediol, DEG represents diethylene glycol, and ε-CL unit represents a unit derived from ε-caprolactone.

Further, the amounts of "polybasic carboxylic acid", "polyhydric alcohol component", and "ε-CL unit" in Table 1 represent the amount equal to the sum of the amount of the polybasic carboxylic acid and the amount of the ε-caprolactone-derived unit in the chip based on 100 mole %, the amount equal to the sum of the amount of the polyhydric alcohol component and the amount of the ε-caprolactone-derived unit in the chip based on 100 mole %, and the amount equal to the sum of the amount of the ester unit and the amount of the ε-caprolactone-derived unit in the chip based on 100 mole %, respectively.

TABLE 2

|  | chip A | chip B | chip C | chip D | chip E | chip F |
|---|---|---|---|---|---|---|
| Intrinsic viscosity (dl/g) | 0.62 | 0.80 | 0.75 | 0.80 | 0.81 | 0.75 |
| Solid residue | very few | much | none | none | none | very few |
| Melting specific resistance ($\times 10^8$ Ω·cm) | 2.53 | 0.13 | 0.22 | 10.70 | 0.27 | 0.23 |

Example 1

A pre-dried chip E was molten and extruded by a uni-axial extruder at 280° C., followed by rapid cooling to yield an un-drawn film of 180 μm in thickness. The un-drawn film was preheated at 100° C. for 10 seconds, and drawn in the widthwise direction with use of a tenter. The drawing was performed in three stages. Specifically, the film was drawn 1.3 times longer than the un-drawn film at 85° C. (first stage), subsequently drawn by 1.5 times longer than the film after completion of the first stage at. 80° C. (second stage), and then drawn by 2.0 times longer than the film after completion of the second stage at 75° C. (third stage). Next, heat-treatment was performed for 10 seconds while drawing the film in the widthwise direction at 75° C. by 2% relative to the film after completion of the third stage. Thus, obtained was a heat-shrinkable polyester film having a final drawing ratio of 4.0 times longer than the un-drawn film and a thickness of 45 μm. The composition of the obtained film is shown in Table 3, and the physical properties thereof are shown in Table 4.

Example 2

A pre-dried chip F was molten and extruded by the uni-axial extruder at 280° C, followed by rapid cooling to yield an un-drawn film of 180 μm in thickness. The un-drawn film was preheated at 100° C. for 10 seconds, and drawn in the widthwise direction with use of the tenter. The drawing was performed in three stages. Specifically, the film was drawn 1.3 times longer than the un-drawn film at 85° C. (first stage), subsequently drawn by 1.5 times longer than the film after completion of the first stage at 80° C. (second stage), and then drawn by 2.0 times longer than the film after completion of the second stage at 75° C. (third stage). Next, heat-treatment was performed for 10 seconds while drawing the film in the widthwise direction at 70° C. by 2% relative to the film after completion of the third stage. Thus, obtained was a heat-shrinkable polyester film having a final drawing ratio of 4.0 times longer than the un-drawn film and a thickness of 45 μm. The composition of the obtained film is shown in Table 3, and the physical properties thereof are shown in Table 4.

Comparative Example 1

Pre-dried chips B, C, D respectively in the amounts of 70 mass %, 25 mass %, and 5 mass % were mixed together, and the mixture was molten and extruded by the uni-axial extruder at 280° C., followed by rapid cooling to yield an un-drawn film of 180 μm in thickness. The un-drawn film was preheated at 88° C. for 10 seconds, and drawn in the widthwise direction at 75° C. 4.0 times longer than the un-drawn film with use of the tenter. Next, heat-treatment was performed at 79° C. for 10 seconds. Thus, obtained was a heat-shrinkable polyester film having a thickness of 45 μm. The composition of the obtained Comparative Example 2

Pre-dried chips A, C, D respectively in the amounts of 25 mass %, 49 mass %, and 26 mass % were mixed together, and the mixture was molten and extruded by the uni-axial extruder at 280° C., followed by rapid cooling to yield an un-drawn film of 180 μm in thickness. The un-drawn film was preheated at 88° C. for 10 seconds, and drawn in the widthwise direction at 73° C. 4.0 times longer than the un-drawn film with use of the tenter. Next, heat-treatment was performed at 72° C. for 10 seconds. Thus, obtained was a heat-shrinkable polyester film having a thickness of 45 μm. The composition of the obtained film is shown in Table 3, and the physical properties thereof are shown in Table 4.

TABLE 3

|  |  | Ex. 1 | Ex. 2 | C. Ex. 1 | C. Ex. 2 |
|---|---|---|---|---|---|
| Polybasic carboxylic acid component (mole %) | TPA | 91.0 | 94.9 | 100 | 100 |
|  | DiA | — | 5.1 | — | — |
| Polyhydric alcohol component (mole %) | CHDM | 16.0 | 14.8 | — | 8.4 |
|  | EG | 62.4 | 83.2 | 65.1 | 65.0 |
|  | NPG | — | — | 23.5 | — |
|  | BD | 10.8 | — | 9.5 | 24.9 |
|  | DEG | 1.8 | 2.0 | 1.9 | 1.7 |
| ε-CL unit(mole %) |  | 9.0 | — | — | — |
| Alkali metal $M^1$ (ppm) | Na | 20 | 18 | 14 | — |
| Alkaline earth metal $M^2$ (ppm) | Mg | 130 | 151 | 137 | 95 |
| P (ppm) |  | 65 | 64 | 16 | 35 |
| Mass ratio($M^2$/P) |  | 2.00 | 2.36 | 8.56 | 2.71 |

In Table 3, the contents of the inorganic components (Na, Mg, P) are represented in terms of the concentrations of the respective corresponding atoms (unit: ppm, based on mass). Further, in Table 3, TPA represents terephthalate, DiA represents dimer acid, EG represents ethylene glycol, CHDM represents 1,4-cyclohexane dimethanol, NPG represents neopentyl glycol, BD represents 1,4-butanediol, DEG represents diethylene glycol, and ε-CL unit represents a unit derived from ε-caprolactone.

Further, the amounts of "polybasic carboxylic acid component", "polyhydric alcohol component", and "ε-CL unit" in Table 3 represent the amount equal to the sum of the amount of the polybasic carboxylic acid component and the amount of the ε-caprolactone-derived unit in the film based on 100 mole %, the amount equal to the sum of the amount of the polyhydric alcohol component and the amount of the ε-caprolactone-derived unit in the film based on 100 mole %, and the amount equal to the sum of the amount of the ester unit and the amount of the ε-caprolactone-derived unit in the film based on 100 mole %, respectively.

TABLE 4

|  | Ex. 1 | Ex. 2 | C. Ex. 1 | C. Ex. 2 |
|---|---|---|---|---|
| Solid residue | very few | very few | much | none |
| Melting specific resistance ($\times 10^8$ Ω·cm) | 0.28 | 0.22 | 0.18 | 1.53 |
| Casting | ◯ | ◯ | ◯ | X |
| Heat shrinkage factor (%) |  |  |  |  |
| (A) | 37.2 | 33.5 | 31.0 | 24.0 |
| (B) | 58.1 | 55.7 | 57.3 | 44.6 |
| (C) | 69.0 | 67.5 | 61.0 | 53.3 |
| (A) after storage at 40° C., 160 hours | 34.2 | 30.0 | 19.0 | 17.5 |
| variation: X(%) | 3.0 | 3.5 | 12.0 | 6.5 |
| Intrinsic viscosity (dl/g) | 0.73 | 0.68 | 0.71 | 0.61 |
| Tear resistance (%) | 0 | 0 | 0 | 30 |
| Max. heat shrinkage stress (MPa) | 7.3 | 8.2 | 8.0 | 9.2 |
| Thickness distribution (%) | 4.0 | 3.5 | 4.8 | 8.8 |
| Shrinkage finishing |  |  |  |  |
| Before storage | 5 | 5 | 3 | 3 |
| After storage at 40° C., 160 hours | 5 | 5 | 1 | 2 |

INDUSTRIAL APPLICABILITY

The inventive heat-shrinkable polyester film is advantageous because the inventive film has no or less defects such as whitening, shrinkage shading, crinkling, distortion, or uneven shrinkage in a direction orthogonal to the maximum shrinkage direction. Even if a high shrinkage factor is required locally, a resultant product made from the inventive film provides satisfactory finishing appearance after shrinkage. Thus, the inventive film is suitable for a variety of kinds of film products such as shrinkable labels, cap seals, and shrinkable packages.

Further, the inventive production process makes it possible to provide the inventive heat-shrinkable polyester films having the above-mentioned properties.

The invention claimed is:

1. A heat-shrinkable polyester film in which the content of 1,4-cyclohexane dimethanol is 10 to 50% by mole based on a polyhydric alcohol component, and heat shrinkage factors (A), (B), and (C) of a 10 cm square sample of the film are 30 to 40%, 50 to 60%, and 65 to 77%, respectively:
   wherein
   (A) is a heat shrinkage factor of the square sample in a maximal shrinkage direction under the condition that the square sample is immersed in hot water of 75° C. for 10 seconds, and then in water of 25° C. for 10 seconds;
   (B) is a heat shrinkage factor of the square sample in the maximal shrinkage direction under the condition that the square sample is immersed in hot water of 85° C. for 10 seconds, and then in water of 25° C. or 10 seconds; and
   (C) is a heat shrinkage factor of the square sample in the maximal shrinkage direction under the condition that the square sample is immersed in hot water of 95° C. for 10 seconds, and then in water of 25° C. for 10 seconds,
   said film is made by a process comprising: drawing the film in at least one direction in three or more stages, wherein the drawing temperature in the second drawing stage or thereafter is substantially identical to or about 1 to 10° C lower than the drawing temperature in the immediate prior stage,
   wherein in the first drawing stage, the film is drawn to 1.1 to 1.5 times longer than the undrawn film,
   wherein in the second drawing stage, the film is drawn to 1.3 to 1.7 times longer than the film after the first drawing stage,
   wherein in the final stage, the film is drawn to 1.5 to 2.5 times longer than the film after the second drawing stage, and
   wherein during the final drawing stages the film is drawn to 3 to 6 times longer than the undrawn film.

2. The film according to claim 1, wherein the film has an intrinsic viscosity of 0.66 dl/g or larger.

3. The film according to claim 1, wherein the film has a specific resistance in melting at 275° C. of $0.70 \times 10^8$ Ω■cm or less.

4. The film according to any one of claim 1, wherein the film has a thickness distribution of 7% or lower, the thickness distribution being calculated according to the following equation under the condition that a thickness variation in the maximal shrinkage direction of the film is measured with respect to a test piece of 50 cm in length and 5 cm in width:

thickness distribution=[(maximal thickness− minimal thickness)/average thickness]×100.

5. The film according to any one of claim 1, wherein the film has a maximal heat shrinkage stress of 3.0 MPa or larger under the condition that a heat shrinkage test in the maximal shrinkage direction of the film is carried out in hot air of 90° C. with use of a test piece of 20 mm in width, and with a distance between corresponding chucks of 100 mm.

6. The film according to claim 1, wherein said film comprises a Tg-lowering ester unit in the amount of about 0.1% to about 30% by mole based on the total content of the ester units of the film, wherein the Tg-lowering ester unit is selected from (1) an ester unit comprising a polyhydric alcohol component selected from the group consisting of 1,3-propanediol, 1,4-butanediol, dimer diol, and polyoxytetramethylene glycol;

(2) an ester unit comprising a polybasic carboxylic acid component selected from the group consisting of dimer acid, adipic acid, sebacic acid, and azelaic acid; and (3) an ester unit derived from $\epsilon$-caprolactone.

7. The film according to claim 1, wherein the polyhydric alcohol component is selected from the group consisting of 1,4-butanediol, dimer diol, and polyoxytetramethylene and the polybasic carboxylic acid component is dimer acid.

* * * * *